Feb. 26, 1929.
J. C. PHILLIPS ET AL
1,703,360
AMUSEMENT CAR
Filed Dec. 15, 1926
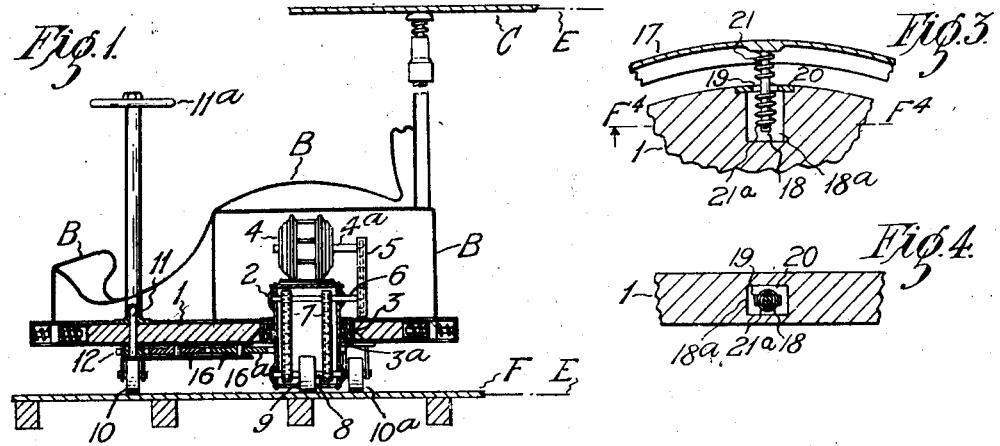
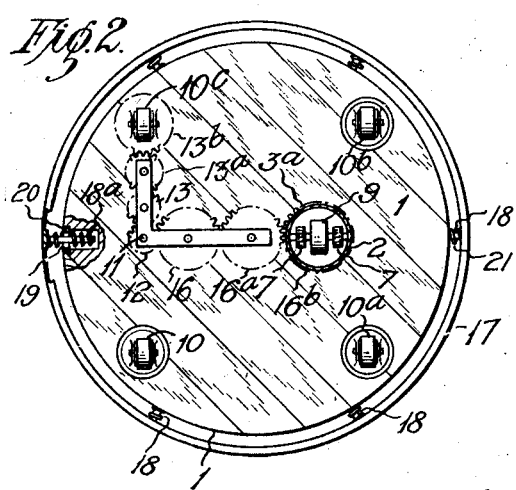
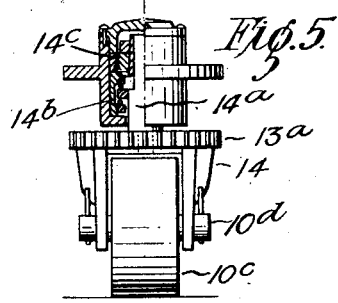
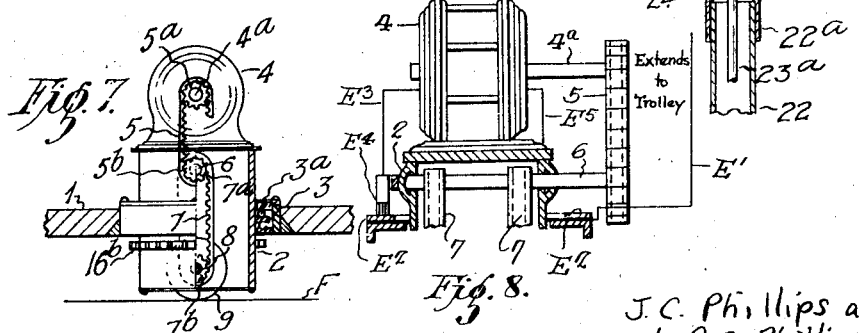
J. C. Phillips and
H. G. O. Phillips
Inventors
By: Marks & Clark
Attys.

Patented Feb. 26, 1929.

1,703,360

UNITED STATES PATENT OFFICE.

JOHN CHARLES PHILLIPS AND HECTOR GRAHAM OLIVER PHILLIPS, OF ST. KILDA, VICTORIA, AUSTRALIA.

AMUSEMENT CAR.

Application filed December 15, 1926, Serial No. 155,025, and in Australia May 26, 1926.

Our invention relates to improvements in passenger carrying means which travel along erratic courses, and are herein called amusement cars. Such cars include those relatively to which an electrically charged ceiling supplies current through trolleys to motors on the cars.

The degree to which existing cars of the kind stated can be guided by unskilled passengers varies, but is less than we find to be desirable; and one object of our invention is to augment the power of such guidance, but without enabling the guidance to be so easy or effectual as to impair the pleasure and thrill yielding attributes of the cars.

Other objects of our invention are to improve the car, trolley, and driving mechanism, and the car fender devices.

An embodiment of our improvements is illustrated in the accompanying drawings but modifications may be made within the scope of our claims.

In the drawings Figure 1 is a side sectional view, showing a ceiling, trolley, car, and floor.

Figure 2 is a plan of an inverted car, some parts being in section.

Figures 3 to 6 are on a larger scale.

Figure 3 is a sectional plan of fender or bumper devices.

Figure 4 is a section on line $F^4$.

Figure 5 is a front view partly in section of a steering castor.

Figure 6 is a sectional view of the trolley head.

Figure 7 is a partly sectional view of drive devices, at right angles to Figure 1.

Fig. 8 is an enlarged detail of a part of the car diagrammatically illustrating the electric circuit of the motor.

C is an electrically charged ceiling, F a floor of conducting material, B a car the details of which may vary, and E are electric conductors extending from the ceiling and the floor to form a suitable circuit through the trolley, motor, and a floor wheel 9 of the car. The conductor $E'$ extending through the trolley is connected with a fixed insulated ring $E^2$ engaged by a brush $E^4$ carried by the casing 2 (to be hereinafter referred to). The brush $E^4$ is connected with one terminal of the motor 4 by a conductor $E^3$ and the opposite terminal of said motor is connected by a return conductor $E^5$ to the casing 2, and thence to the floor F through parts of the mechanism to be hereinafter more fully described.

The car has a platform 1 which carries the rotatable tubular casing 2, having a circumferential flange 3 between bearings $3^a$. The casing carries the motor 4 having an axle $4^a$. A chain 5 passes around sprockets at $5^a$, $5^b$, the latter sprocket being on a shaft 6 carried by the casing. To transmit motion from the latter shaft we provide chains 7 which pass around sprockets $7^a$, $7^b$, the latter sprocket being on a shaft 8 which is mounted in the casing base near the floor. Between chains 7 is the floor wheel 9 its vertical central line being coincident with the axis of casing 2.

The car is also supported on floor F by a number of other members, located in any suitable positions and shown as castors 10, $10^a$, $10^b$, which are unguided, and which in practice independently and easily alter their directions.

We provide in addition a guidable floor wheel $10^c$ in any suitable position. This wheel is guidable by a passenger in the car, who when he uses a steering means provided, guides a plurality of members 9 and $10^c$. He thus to a desirable, but limited extent, directs the car on the course he predetermines. In order to enable the simultaneous drive of floor wheels to occur, any convenient mechanism is usable; and by way of example we show a train of gear wheels, their teeth and their diameter ratios being variable to enable any predetermined driving effects to be secured.

The passenger is provided with a steering wheel $11^a$ on a column 11 for example. The latter carries a gear wheel 12, which is in train in one direction with gear wheels 13, $13^a$, $13^b$; and is in train in another direction with gear wheels 16, $16^a$, $16^b$. Wheel $13^b$ is upon the framing of floor wheel $10^c$ and thus guides the latter; and wheel $16^b$ is annular on casing 2 and thus guides wheel 9. The axle $10^d$ of wheel $10^c$ is carried by a frame 14 which carries wheel $13^b$ and a post $14^a$, which projects upwardly between thrust and lateral bearings, $14^b$, $14^c$ respectively in a casing $14^d$ which is secured to the car.

Shock reducing means which extends around the car includes a fender or bumper which (see Figure 1) is internally channelled and is spaced from any suitable part of the car body by resilient members. Thus a series of stems 18 is spaced around the fender and each is kept in normal position by spring means. These stems extend through spacious holes 19—Figures 3 and 4—in plates 20, into spaces 18ª, a spring 21 being located between the fender and the plate 20 and a spring 21ª being located between the said plate and the stem end 18ᵇ.

The springs tend to expand but allow the fender to compress them, the fender yielding in any direction according to the direction of any shock it receives. The life of the fender is thus prolonged and bad working of the car during use is prevented. The break-downs which have occurred in the use of cars having fenders of other types are thus avoided.

The trolley pole 22—Figure 6—is hollow and has a cap 22ª, and means, shown as a button 23 on a rotatable stem 23ª for picking up the electric current from the ceiling, and conveying it to the car motor. The button is urged upwardly by the pressure on it of a spring 23ᵇ which has any suitable lower bearing. The stem 23 is enclosed by thrust and lateral bearings 24, 24ª shown within cap 22ª. Such a stem is during car travel, easily rotated and easily moved vertically.

In the claims the term "power unit" is employed for brevity to indicate the mechanism provided to cause rotation of floor wheel 9.

We claim:—

1. An amusement car having unguided rotatable supports, a power unit, a driven wheel in said power unit, an undriven floor wheel, a manually controllable steering column, a toothed wheel on said column, gears extending from the said toothed wheel in divergent directions to a toothed wheel on the power unit, and a toothed wheel on the mounting of the undriven floor wheel, to steer the said power unit wheel and the undriven floor wheel, the said mounting being supported in thrust and lateral bearings.

2. An amusement car including a power unit provided with a driven wheel partially supporting the car, an undriven floor wheel, a manually controlled steering column, means for transmitting steering movement from said column to the power unit wheel and the undriven floor wheel, and unguided rotatable supports coacting with the driven wheel and undriven floor wheel to support the car.

In witness whereof we have hereunto signed our names to this specification at Melbourne, in the State of Victoria, in Australia, this eleventh day of November, 1926.

JOHN CHARLES PHILLIPS.
HECTOR GRAHAM OLIVER PHILLIPS.